UNITED STATES PATENT OFFICE 2,471,525

REACTION OF AN ACETYLENE WITH HF TO PRODUCE VINYL FLUORIDE AND/OR DIFLUOROETHANE AND HOMOLOGUES THEREOF

John C. Hillyer and Joseph F. Wilson, Bartlesville, Okla., assignors to Phillips Petroleum Company, a corporation of Delaware No Drawing. Application December 19, 1947, Serial No. 792,832

11 Claims. (Cl. 260—653)

This invention relates to the reaction of an acetylene with hydrogen fluoride. In one aspect it relates to an improved process for the production of vinyl fluoride. In another aspect the invention relates to an improved process for the production of 1,1-difluoroethane. In a broader aspect the invention relates to an improved process for producing difluorohydrocarbons.

The direct noncatalytic interaction of acetylene with hydrogen halides to produce vinyl halides is well known. However, this method of procedure, particularly when applied to the hydrofluorination of an acetylene, is too inefficient, both as regards rate of reaction and yield of product, to have commercial significance. Catalysts such as mercuric oxide or mercuric halide have been employed to activate the interaction of acetylene with other hydrogen halides, particularly hydrogen chloride. However, attempts to use these catalysts for the hydrofluorination of acetylene have resulted in numerous difficulties, such as long induction periods before the reaction begins, poor yields of product, rapid deterioration of the catalyst, and the like.

We have discovered a process for the hydrofluorination of an acetylene wherein the catalyst employed comprises aluminum trifluoride, aluminum oxide, or mixtures of these materials. When operating according to our process, induction periods are short, reaction rates are high, and catalyst life is long. The degree of utilization of the acetylene is high and increases as the reaction proceeds, becoming substantially quantitative after a few hours.

An object of this invention is to provide an improved process for the interreaction of an acetylene and hydrogen fluoride.

Another object of this invention is to produce vinyl fluoride.

A further object of this invention is to produce 1,1-difluoroethane.

Still a further object of this invention is to produce difluoro derivatives of paraffin hydrocarbons.

Further objects and advantages of this invention will become apparent, to one skilled in the art, from the accompanying disclosure and discussion.

In accordance with our invention, an acetylene is mixed with hydrogen fluoride and contacted with the catalyst. The catalyst is preferably in a granular or pulverulent form, and may be employed either as a fixed bed of coarse catalyst granules, as a single bed of small, even powdery, fluent particles in ebullient motion as a stream of a reacting mixture passes up through it, or as a flowing stream of small, or even powdery, fluent particles moving through a reaction zone. The reaction is exothermic, and some suitable, conventional means should be used to maintain a desired reaction temperature and take up heat of reaction. The acetylene reactant may be acetylene, itself, or some homologue of higher molecular weight, preferably one having not more than ten carbon atoms per molecule.

The product obtained from the reaction of acetylene itself comprises vinyl fluoride and 1,1-difluoroethane in substantially equal proportions. Each of these materials has important uses in the chemical industries, and each can be readily recovered from the reaction products. Vinyl fluoride, heretofore in short supply due to the lack of a suitable method for its preparation, has valuable applications in the production of synthetic resins; 1,1-difluoroethane has valuable properties as a refrigerant, a propellant for aerosol-type insecticide sprays, and the like. When an acetylene of a higher number of carbon atoms per molecule is reacted, the proportion of difluoro product is higher, and tends to become the sole primary reaction product. In such a case both fluorine atoms become attached to the same carbon atom, which is generally the more central, in the molecule, of the two initially-available carbon atoms. The reaction mixture may contain only the two reactants or, if desired, may contain a diluent which is inert under the reaction conditions, such as nitrogen, methane, carbon tetrafluoride, etc.

The aluminum trifluoride catalyst of our invention is preferably prepared in the form of pellets, by the use of small amounts of a binder such as graphite, hydrogenated corn oil, and the like. However, when desired, the aluminum trifluoride may be deposited on a carrier such as alumina, a bauxite high in alumina and with a low silica content, etc., or may be combined with materials such as activated carbon to provide highly effective results.

The mechanism by which our aluminum oxide catalysts operate is not entirely clear. It may be possible that small amounts of an aluminum fluoride, such as aluminum-oxyfluoride, in a highly active state is formed on the catalyst surface. However, if such a change in the initial aluminum oxide occurs, the quantity of such an aluminum fluoride is exceedingly small. A granular material which is aluminum oxide initially is a good catalyst for the reaction herein discussed, however, whatever the source of the catalytic activity, and the above suggestion is offered merely for general interest.

Before contacting with the reactants the catalyst is preferably dried by heating, in the catalyst case, in a stream of inert gas. In the practice of our process the acetylene and hydrogen fluoride are mixed, preferably with a molar excess of hydrogen fluoride, in a ratio of up to about fifteen mols of hydrogen fluoride (HF) to one mol of acetylene hydrocarbon, and passed over the catalyst at a temperature between 350 and 750° F., preferably between 450 and 650° F. The flow rate of the reaction mixture should be between 150 and 400, preferably between 200 and 300 volumes (standard conditions) per volume catalyst per hour. Pressures will, in general, be substantially atmospheric, although values somewhat above or below this level, such as up to about 50 pounds per square inch gage, may be employed, when desired. At the beginning of each run a short induction period is usually observed with aluminum trifluoride, generally from about ten to about 30 minutes in length, although there is substantially no induction period with aluminum oxide.

Effluent from the catalyst zone is treated to recover various constituents. In such a separation, the effluent may be treated to separate hydrogen fluoride, as by being passed over sodium fluoride, after which it is condensed and fractionated to separate an olefinic monofluoride, and/or a difluorohydrocarbon. Unreacted acetylene reactant may be recycled and, if only a difluoro hydrocarbon is desired, the olefinic monofluoride produced may be returned for further reaction.

In the following examples, the data are presented as being typical of the invention, and such data should not be construed to limit the invention unduly.

Example I

A steel tube was charged with 200 cc. of a pelleted catalyst comprising 93.6 per cent of aluminum trifluoride and 6.4 per cent of flake graphite used as a binder. The catalyst was heated for two hours at a temperature of 600° F. in a current of nitrogen to remove moisture. Acetylene and hydrogen fluoride were then mixed, in a mol ratio of 1 to 2.24, and passed over the catalyst at a rate of 332.5 volumes per volume of catalyst per hour, the temperature being held at 600° F. Effluent gases were passed through a steel tube containing sodium fluoride to remove unreacted hydrogen fluoride, after which they were condensed in a dry ice cooled trap.

After an induction period of 15 minutes liquid condensate began to collect in the trap, the rate gradually increasing over the entire period. After eight hours the average condensation amounted to 47.6 cc. per hour. The catalyst activity showed no apparent diminution after the eight hour period, the degree of conversion increasing until the reaction was halted. During the reaction 167.2 liters of acetylene was charged, 5.2 liters of which was recovered unreacted.

Fractionation of the product provided 180 cc. of vinyl fluoride (B. P.—72.2° C.) and 160 cc. of 1,1-difluoroethane (B. P.—24° C.), the remainder being dissolved acetylene.

Example II

The procedure of Example I was repeated using similar feed stock and reaction conditions. After 32 hours operation the temperature in the catalyst zone was reduced to 500° F. to observe whether catalyst activity would continue when so operating. The yield per hour continued to increase for a period of eight hours at which time the run was discontinued.

Example III

A steel tube was charged with 200 cc. of pelleted aluminum oxide. The tube was then heated at a temperature of 600° F. for six hours to dry the catalyst, moisture being swept from the tube by a stream of dry nitrogen. Acetylene and hydrogen fluoride were commingled, in a mol ratio of 1:1.54, and passed over the catalyst at a rate of 142.5 volumes per volume of catalyst per hour. Effluent gases were passed through a steel tube containing sodium fluoride, to remove unreacted hydrogen fluoride, after which they were condensed in a Dry Ice-cooled trap.

At the end of eight hours the proportions of acetylene and hydrogen fluoride were changed to provide a mol ratio of 1:1.62 and the run continued for 6.5 hours. Ratios of feed materials and flow rates were altered from time to time and the volume of product determined as the reaction proceeded until the catalyst had been used for a total of 38.5 hours. Data on the entire operation are shown in the accompanying table.

| Average Temp., °F. | Time, Hrs. | Mol Ratio $C_2H_2$:HF | Flow Rate v./v./Hrs. | Contact Time, Sec. | Avg. Yield [1] cc./cc. catalyst | Unreacted $C_2H_2$, Per Cent |
|---|---|---|---|---|---|---|
| 600 | 8.0 | 1:1.54 | 142.5 | 11.4 | 0.098 | 28.2 |
| 600 | 6.5 | 1:1.62 | 179.0 | 9.5 | 0.119 | 29.8 |
| 600 | 8.0 | 1:1.57 | 198.5 | 8.5 | 0.136 | 28.8 |
| 600 | 8.0 | 1:2.43 | 317.5 | 5.2 | 0.169 | 25.6 |
| 600 | 8.0 | 1:1.11 | 185.0 | 8.9 | 0.171 | 22.3 |

[1] Yield based on total liquid product. Fractionation showed this product to comprise 44.7 per cent (average value) vinyl fluoride and 40.6 per cent 1,1-difluoroethane. The remainder, 14.7 per cent was found to be dissolved acetylene. No 1,2-difluoroethane was isolated.

Example IV

Hydrogen fluoride and 1-hexyne were mixed, in a mol ratio of hydrocarbon to hydrogen fluoride 1:12.5, and passed over a pilled catalyst comprising aluminum trifluoride together with a small amount (6.5 per cent) of a graphite binder. The space velocity was about 500 volumes per volume catalyst per hour and the temperature was 450° F. Upon fractionation of the product it was found that a conversion of 1-hexyne to 2,2-difluorohexane of about 85 per cent had been obtained.

Example V

The procedure of the run of Example IV was repeated, using 1-pentyne as reactant. The mol ratio of the acetylene to HF was 1:1.49, the space velocity of the reactants was 383 volumes per volume of catalyst per hour, and the reaction temperature was 450° F. Conversion of the acetylene to 2,2-difluoropentane was 42.1 volume per cent in a single pass, with an ultimate yield of 84 per cent based on recycle operation.

We claim:

1. An improved method of reacting acetylene and hydrogen fluoride to produce an addition product, which comprises admixing hydrogen fluoride and acetylene in a mol ratio between 1:1 and 15:1, passing said admixture into a reaction zone containing a solid catalyst of the group consisting of aluminum fluoride and aluminum oxide, maintaining in said reaction zone a reaction temperature between 350 and 750° F., maintaining a flow rate of said reactants into said reaction zone between 150 and 400 volumes per volume of catalyst per hour, and recovering from effluents of said reaction zone an addition product of acetylene and hydrogen fluoride.

2. An improved method of reacting acetylene and hydrogen fluoride to produce an addition product, which comprises admixing hydrogen fluoride and acetylene in a mol ratio between 1:1 and 15:1, passing said admixture into a reaction zone containing a solid aluminum fluoride catalyst, maintaining in said reaction zone a reaction temperature between 350 and 750° F., maintaining a flow rate of said reactants into said reaction zone between 150 and 400 volumes per volume of catalyst per hour, and recovering from effluents of said reaction zone an addition product of acetylene and hydrogen fluoride.

3. An improved method of reacting acetylene and hydrogen fluoride to produce an addition product, which comprises admixing hydrogen fluoride and acetylene in a mol ratio between 1:1 and 15:1, passing said admixture into a reaction zone containing a solid aluminum oxide catalyst, maintaining in said reaction zone a reaction temperature between 350 and 750° F., maintaining a flow rate of said reactants into said reaction zone between 150 and 400 volumes per volume of catalyst per hour, and recovering from effluents of said reaction zone an addition product of acetylene and hydrogen fluoride.

4. An improved method of reacting an acetylene having not more than ten carbon atoms per molecule and hydrogen fluoride to produce an addition product, which comprises admixing hydrogen fluoride and such an acetylene in a mol ratio between 1:1 and 15:1, passing said admixture into a reaction zone containing a solid catalyst of the group consisting of aluminum fluoride and aluminum oxide, maintaining in said reaction zone a reaction temperature between 350 and 750° F., maintaining a flow rate of said reactants into said reaction zone between 150 and 400 volumes per volume of catalyst per hour, and recovering from effluents of said reaction zone an addition product of said acetylene and hydrogen fluoride.

5. An improved method of reacting an acetylene having not more than ten carbon atoms per molecule and hydrogen fluoride to produce an addition product, which comprises admixing hydrogen fluoride and such an acetylene in a mol ratio between 1:1 and 15:1, passing said admixture into a reaction zone containing a solid aluminum fluoride catalyst, maintaining in said reaction zone a reaction temperature between 350 and 750° F., maintaining a flow rate of said reactants into said reaction zone between 150 and 400 volumes per volume of catalyst per hour, and recovering from effluents of said reaction zone an addition product of said acetylene and hydrogen fluoride.

6. An improved method of reacting an acetylene having not more than ten carbon atoms per molecule and hydrogen fluoride to produce an addition product, which comprises admixing hydrogen fluoride and such an acetylene in a mol ratio between 1:1 and 15:1, passing said admixture into a reaction zone containing a solid aluminum oxide catalyst, maintaining in said reaction zone a reaction temperature between 350 and 750° F., maintaining a flow rate of said reactants into said reaction zone between 150 and 400 volumes per volume of catalyst per hour, and recovering from effluents of said reaction zone an addition product of said acetylene and hydrogen fluoride.

7. An improved method for reacting an acetylene and hydrogen fluoride, which comprises contacting a mixture comprising an acetylene and a molar excess of hydrogen fluoride with a solid catalyst comprising a catalytic material of the group consisting of aluminum fluoride and aluminum oxide at an elevated reaction temperature, whereby hydrogen fluoride adds to said acetylene, and recovering a resulting fluoro hydrocarbon.

8. An improved process for the production of vinyl fluoride, which comprises admixing acetylene and a molar excess of hydrogen fluoride, passing a resulting mixture into contact with an aluminum fluoride catalyst at a temperature between 450 and 650° F. and a space velocity of 200 to 300 volumes per volume of catalyst per hour, and recovering from effluents of said reaction vinyl fluoride so produced.

9. An improved process for the production of vinyl fluoride, which comprises admixing acetylene and a molar excess of hydrogen fluoride, passing a resulting mixture into contact with an aluminum oxide catalyst at a temperature between 450 and 650° F. and a space velocity of 200 to 300 volumes per volume of catalyst per hour, and recovering from effluents of said reaction vinyl fluoride so produced.

10. An improved process for the production of 2,2-difluoroethane, which comprises admixing acetylene and a molar excess of hydrogen fluoride, passing a resulting mixture into contact with an aluminum fluoride catalyst at a temperature between 450 and 650° F. and a space velocity of 200 to 300 volumes per volume of catalyst per hour, and recovering from effluents of said reaction 2,2-difluoroethane so produced.

11. An improved process for the production of 2,2-difluoroethane, which comprises admixing acetylene and a molar excess of hydrogen fluoride, passing a resulting mixture into contact with an aluminum oxide catalyst at a temperature between 450 and 650° F. and a space velocity of 200 to 300 volumes per volume of catalyst per hour, and recovering from effluents of said reaction 2,2-difluoroethane so produced.

JOHN C. HILLYER.
JOSEPH F. WILSON.

REFERENCES CITED

The following references are of record in the file of this patent:

UNITED STATES PATENTS

| Number | Name | Date |
|---|---|---|
| 2,118,901 | Soll | May 31, 1938 |
| 2,401,850 | Whitman | June 11, 1946 |
| 2,437,148 | Barney | Mar. 2, 1948 |